US010969228B2

(12) United States Patent
Bobye

(10) Patent No.: US 10,969,228 B2
(45) Date of Patent: Apr. 6, 2021

(54) RELATIVE POSITION NAVIGATION SYSTEM FOR MULTIPLE MOVING VEHICLES

(71) Applicant: NovAtel Inc., Calgary (CA)

(72) Inventor: Michael Bobye, Calgary (CA)

(73) Assignee: NovAtel Inc., Calgary (CA)

( * ) Notice: Subject to any disclaimer, the term of this patent is extended or adjusted under 35 U.S.C. 154(b) by 244 days.

(21) Appl. No.: 16/000,463

(22) Filed: Jun. 5, 2018

(65) Prior Publication Data

US 2019/0368881 A1 Dec. 5, 2019

(51) Int. Cl.
*G01C 21/28* (2006.01)
*G08G 5/02* (2006.01)
*G01S 19/15* (2010.01)
*G01C 21/16* (2006.01)

(52) U.S. Cl.
CPC ............ *G01C 21/28* (2013.01); *G01C 21/165* (2013.01); *G01S 19/15* (2013.01); *G08G 5/025* (2013.01)

(58) Field of Classification Search
CPC ....... G01C 21/28; G01C 21/165; G01S 19/15; G08G 5/025; G08G 5/0013; G08G 5/00; G08G 5/0026; G05D 1/0676; G05D 1/0684; G05D 1/0858; G05D 1/102; G05D 1/0027; B64F 1/18; B64F 1/20; B64F 1/205; B64F 1/12; B64F 1/125
USPC ......... 701/16, 300, 301, 302, 472, 480, 510, 701/532; 342/33, 357.27, 357.34, 357.53, 342/357.2, 357.23; 244/183, 116
See application file for complete search history.

(56) References Cited

U.S. PATENT DOCUMENTS

| | | | | |
|---|---|---|---|---|
| 4,259,658 A | * | 3/1981 | Basov | G05D 1/0684 244/114 R |
| 4,995,722 A | * | 2/1991 | Sutour | B64F 1/12 244/17.17 |
| 5,235,513 A | * | 8/1993 | Velger | G01S 5/163 701/16 |
| 5,287,104 A | * | 2/1994 | Shemwell | B64F 1/20 340/555 |
| 5,438,337 A | * | 8/1995 | Aguado | G01S 19/43 342/357.48 |
| 5,898,680 A | * | 4/1999 | Johnstone | H04B 7/18523 370/316 |

(Continued)

FOREIGN PATENT DOCUMENTS

JP 6247394 9/1994

OTHER PUBLICATIONS

Ford, Tom J. and Janet Neumann, NovAtel's RT20—*A Real Time Floating Ambiguity Positioning System*, Proceedings of ION GPS-94, Salt Lake City, Utah, Sep. 20-23, 1994. The Institute of Navigation, Washington, D.C. pp. 1067-1076.

(Continued)

*Primary Examiner* — Richard A Goldman
(74) *Attorney, Agent, or Firm* — Cesari and McKenna, LLP

(57) ABSTRACT

A relative navigation system comprising of a pair of Global Navigation Satellite System (GNSS) and Inertial Navigation System (INS) units that communicate to provide updated position, velocity and attitude information from a master to a rover. The rover unit produces a carrier based solution that enables the system to reduce the uncorrelated low latency position error between the master and the rover units to less than 50 cm.

18 Claims, 4 Drawing Sheets

(56) References Cited

U.S. PATENT DOCUMENTS

| | | | | |
|---|---|---|---|---|
| 5,949,375 A * | 9/1999 | Ishiguro | ............... | G01S 19/49 342/457 |
| 5,991,691 A * | 11/1999 | Johnson | ............... | G01S 19/15 342/357.27 |
| 6,064,924 A * | 5/2000 | Fleischmann | ......... | G01S 7/411 701/16 |
| 6,114,975 A * | 9/2000 | Guillard | ............. | G01S 5/0063 340/945 |
| 6,553,311 B2 * | 4/2003 | Ahearn | ............. | A01B 69/007 340/815.45 |
| 7,117,417 B2 * | 10/2006 | Sharpe | ............. | G01S 19/41 714/746 |
| 7,693,617 B2 | 4/2010 | Dockter et al. | | |
| 7,706,977 B2 * | 4/2010 | Soehren | ............... | G01S 19/14 701/541 |
| 8,768,558 B2 * | 7/2014 | Reeve | ............... | B62D 15/025 701/28 |
| 8,949,011 B2 * | 2/2015 | Ford | ............... | G01C 21/165 701/300 |
| 9,718,651 B2 * | 8/2017 | Eriksson | ............... | B66C 17/00 |
| 2005/0033489 A1 * | 2/2005 | Tezuka | ............... | G05D 1/0684 701/16 |
| 2005/0110676 A1 * | 5/2005 | Heppe | ............... | G01S 19/07 342/357.34 |
| 2005/0125142 A1 * | 6/2005 | Yamane | ............. | G01C 21/005 701/510 |
| 2007/0016371 A1 * | 1/2007 | Waid | ............... | G01C 21/06 701/470 |
| 2007/0021878 A1 * | 1/2007 | Builta | ............... | B64C 13/20 701/7 |
| 2008/0071431 A1 * | 3/2008 | Dockter | ............... | G01C 21/00 701/3 |
| 2008/0088504 A1 * | 4/2008 | Dutton | ............... | G01S 5/0284 342/357.27 |
| 2010/0211315 A1 * | 8/2010 | Toda | ............... | G01S 19/49 701/472 |
| 2010/0228408 A1 * | 9/2010 | Ford | ............... | G08G 5/0013 701/16 |
| 2011/0006164 A1 * | 1/2011 | Martensson | ......... | G05D 1/0684 244/183 |
| 2011/0285583 A1 * | 11/2011 | Huang | ............... | G01S 19/40 342/357.23 |
| 2013/0116966 A1 * | 5/2013 | D'Jesus Bencci | .... | G01S 5/0242 702/150 |
| 2013/0179074 A1 * | 7/2013 | Haverinen | ............. | G06F 17/00 701/525 |
| 2015/0369924 A1 * | 12/2015 | Hedgecock | ........... | G01S 5/0072 342/357.34 |
| 2016/0349376 A1 * | 12/2016 | Kazemi | ............... | G01S 19/34 |
| 2017/0254904 A1 * | 9/2017 | Zhodzishsky | ........... | G01S 19/04 |
| 2018/0027519 A1 * | 1/2018 | Lee | ............... | H04W 16/28 455/456.1 |
| 2019/0368881 A1 * | 12/2019 | Bobye | ............... | G01C 21/165 |

OTHER PUBLICATIONS

Ford, Tom et al., *OEM4 Inertial: A Tightly Integrated Decentralised Inertial/GPS Navigation System*, Proceedings of ION GPS 2001, Salt Lake City, Utah, 11 pgs.

Ford, Tom et al., *OEM4 Inertial/GPS Navigation System on the OEM4 Receiver*, Proceedings of 2001 International Symposium on Kinematic Systems in Geodesy, Geomatics and Navigation, Banff, Alberta, 19 pgs.

Neumann, Janet Brown et al., *Test Results from a New 2 cm Real Time Kinematic GPS Positioning System*, Proceedings of ION GPS-96, Kansas City, Missouri, Sep. 17-20, 1996. 10 pgs.

Neumann, Janet Brown et al., *Real-Time Carrier Phase Positioning Using the RTCM Standard Message Types 20/21 and 18/19*, Proceedings of ION GPS '97, Kansas City, Missouri, Sep. 17-20, 1997, The Institute of Navigation, Washington, D.C. pp. 857-866.

Wanniger, Lambert: "Introduction to Network RTK", IAG Working Group 4.5.1: Network RTK, http:/www.network-rtk.info/intro/introduction.html, Jun. 11, 2004, pp. 1-5.

Wegener, Volker and Wanniger, Lambert: "Communication Options for Network RTK", IAG Working Grouop 4.5.1: Newtork RTK, http:\www.network-rtk.info/wegener/communciation.html, Feb. 3, 2005, pp. 1-4.

Wikipedia Real Time Kinematic, http://en.wikeipedia.org/wiki/Real_Time_Kinematic, printed Apr. 3, 2009, 3 pages.

U.S. Appl. No. 60/716,897, entitled Helicopter Ship Board Landing System, filed Sep. 14, 2005.

* cited by examiner

RELATIVE POSITION NAVIGATION SYSTEM FOR MULTIPLE MOVING VEHICLES

CROSS-REFERENCE TO RELATED APPLICATIONS

The present application is related to U.S. patent application Ser. No. 11/520,212, which was filed on Sep. 13, 2006, issued as U.S. Pat. No. 8,949,011 on Feb. 3, 2015 by Tom Ford, et al. for a HELICOPTER SHIP BOARD LANDING SYSTEM and U.S. Provisional Application Ser. No. 60/716,897, filed on Sep. 14, 2005, the contents of both are hereby incorporated by reference.

BACKGROUND

Technical Field

This invention relates to the navigation of one moving vehicle relative to another moving vehicle.

Background Information

The relative position, velocity, and when appropriate, attitude of moving vehicles is important for operations in which two or more moving vehicles cooperate with one another, such as, for example, a shipboard landing of aircraft. U.S. Pat. No. 8,949,011, which is assigned to a common Assignee and incorporated herein in its entirety by reference, describes a system for accurately positioning an aircraft, e.g., a helicopter, relative to a designated location, e.g., a landing pad, on a ship. The system uses information from GNSS/INS systems on the respective moving vehicles to determine a linking vector, and then uses a modified RTK procedure to calculate an associated post update correction that is applied to the aircraft INS position in order to produce an accurate relative position of the aircraft.

The post update correction is applied to the aircraft INS position between updates that occur at GNSS measurement epochs, which are the times when the positions of the moving vehicles are known using GNSS satellite signals. The aircraft INS and the ship INS are assumed to have similar errors over the GNSS measurement intervals, and thus, the relative position is accurately determined based on the INS information of the aircraft over the measurement interval. The system works very well to produce accurate relative positions at the IMU output rate, e.g., 100 Hz.

However, it is desirous to have more accurate relative position information that may be used for the shipboard landing, as well as for other operations in which accurate relative position information is desired, such as, in air refueling of aircraft, automated harvesting of farm produce, automated vehicle convoys utilized in, for example, mining, and so forth.

SUMMARY

Embodiments of the present invention make use of a relative navigation system consisting of a pair of Global Navigation Satellite System (GNSS) and Inertial Navigation System (INS) units that communicate to provide updated position, velocity and attitude information from a master to a rover. The rover unit produces a carrier based solution that enables the system to reduce the uncorrelated low latency position error between the master and the rover units to less than 50 cm. The GNSS/INS unit at the master, such as, for example, a ship-based unit, provides the full position, velocity, attitude (PVA) solution, including GNSS observations, pseudorange and carrier measurements. Further, the master unit provides the position of an eccentric point, e.g., a landing pad, to the rover-based unit. The rover-based unit generates a precise carrier-based vector between its own antenna and the GNSS antenna of the master unit and uses this to compute a GNSS position that has a high accuracy relative to the GNSS antenna on the master. This is used to update an inertial guidance unit in the rover so that a low-latency position can be generated by the rover unit. Further, by having the full master PVA solution, the rover may estimate the dynamics experienced at the master by extrapolation based on PVA solutions over multiple measurement intervals, such that the rover unit adjusts the relative positions and thus the correction applied to the rover solution between measurement times to provide greater accuracy at higher rates.

More specifically, in between the matched observations, the rover unit propagates the position, velocity and attitude over a measurement interval based on constant velocity rotation rate models of the movement of the master. This allows the rover to generate relative solutions at rates that coincide with INS sensor readings, e.g., 200 Hz. Further, with the rover having all of the PVA solution information about the master, the relative position information may be rotated to various frames such as, for example, local level, Earth Centered-Earth Fixed (ECEF), remote body frame, master body frame, and the system can thus provide the relative position information in a format that is the most useful to the user or to cooperating instrumentation.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
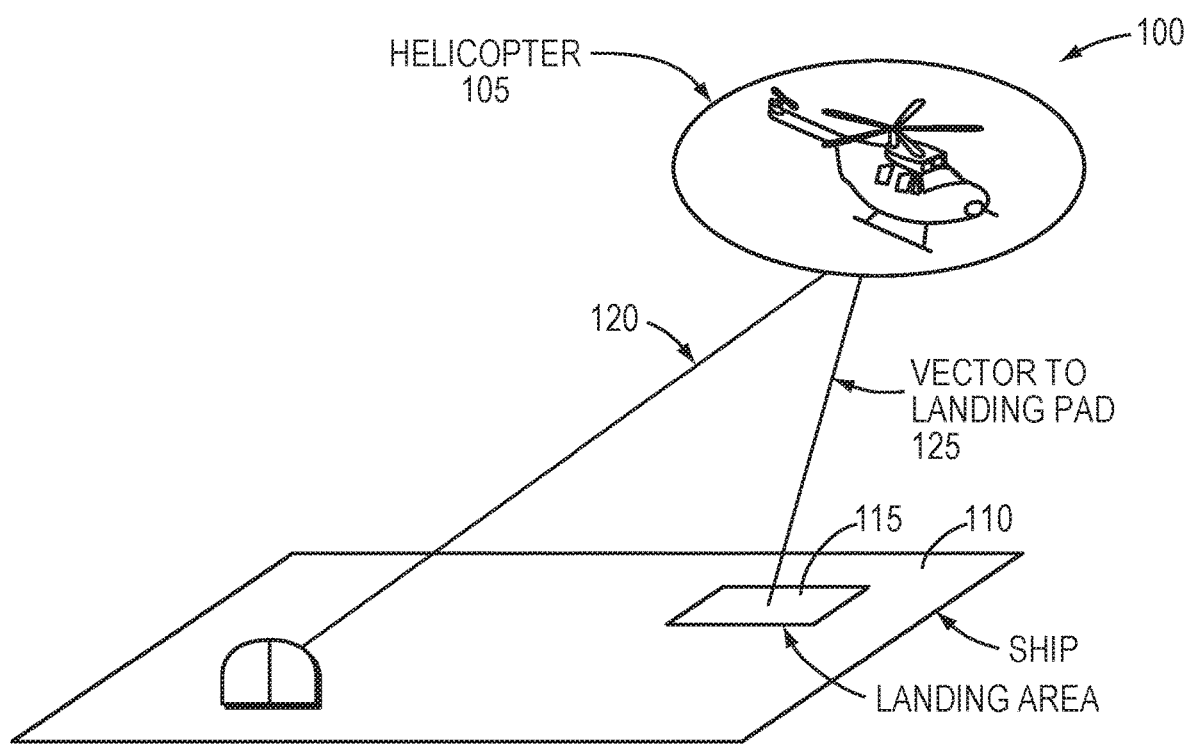
FIG. 1 is a diagram of a system for landing an aircraft on the deck of a vessel in accordance with an illustrative embodiment of the present invention.

Referring now to FIG. 1, the navigation system includes of a pair of GNSS/INS navigation units, one on a master, for example, a ship and one on a rover, for example, a helicopter. Each GNSS/INS unit generates continuous PVA information at the INS output rate, e.g., 200 Hz. The units may also apply an eccentric offset to the position information, such as an aircraft landing pad, at the same rate. The INS errors are controlled with GNSS positions that can be either single point, differentially corrected, PPP (Precise Point Positioning), or derived from the receiver's RTK (Real Time Kinematics) process. In an environment in which there is no stationary base station from which differential corrections can be generated, that is, in which the master is moving independently from the rover, the controlling positions are inertial transferred with a precise baseline vector. In order to obtain an accurate translation vector, an RTK baseline is determined between the GNSS antennas on the moving master and moving rover.

Typically, the RTK process expects pseudorange and carrier measurements that have been observed at a stationary base station receiver. Since the base station is stationary, its carrier observations can be easily modeled to provide the remote receiver with the capability of generating high rate low latency RTK positions. If the base station, here the master, is moving, the observations cannot be effectively modeled, but as discussed below, the measurements taken at the master can be combined with the rover receiver observations to generate low-rate higher latency RTK positions.

The RTK translation vector is applied to the filtered INS estimate of the master antenna position. This is a noise-reduced position with some coloring on the position errors, and the remote INS on the rover does not have to track high-frequency errors. Instead, the object is to weight the controlling (translated) positions at the rover's GNSS/INS unit such that the resulting filtered INS positions have the same error characteristics as at the moving master unit. In this way the positions at the two locations will be accurate relative to one another.

The system illustratively reduces the relative error from the level dictated by the two inertial systems. The inertial errors at both systems are slowly varying (typically at a rate less than a few centimeters per second), and therefore the relative error between the two systems is also slowly varying. Accordingly, the positions measured after the inertial update, can be used to remove the bulk of the relative error over a small (one second) interval to follow. In order to do this, the post update remote position is differenced with the master post update position and the resulting vector is differenced from the RTK moving baseline vector to obtain a post update inertial position correction. This correction is applied to the inertial output at the rover system. As discussed in more detail below, the inertial position correction is updated between measurements to improve accuracy.

To reiterate, the post-update position difference is subtracted from the computed RTK vector to form a post-update position correction. The correction is added to the inertial positions at the rover after they have been generated by the inertial system (raw measurements converted to the ECEF frame and integrated to generate velocity and position). Thus, corrections are not used to modify the position of the inertial system, but only the output of the inertial system.

The method used to generate the accurate linking vector involves using the carrier measurements from the two GNSS receivers in a modified RTK algorithm. The RTK algorithm solves for the carrier ambiguities of the double differenced carrier measurements collected at the two GNSS receivers. It produces a vector that has a typical accuracy of 2 cm, linking the two GNSS antennas used to collect the carrier measurements.

Usually the stationary receiver (the base) transmits its position and carrier measurements to the moving receiver (the rover). The rover matches the transmitted carrier measurements with its measured carrier measurements and uses these to compute the baseline vector. Once this is generated, the vector is added to the transmitted base station position to produce a position with excellent accuracy relative to the moving base station position. However, because both the master and the rover receivers are moving, the only reliable vector available coincides with the even second mark at which time actual measurements from both receivers are available. Thus, the position used to update the rover Kalman filter has some latency associated with it, and the timing of the inertial Kalman update at the rover system is slightly delayed to accommodate this latency. In addition, the timing used to generate the updated rover position (master plus vector) is such as to ensure that both quantities (master position and linking vector) have the same time tag.

For a normal RTK system that has a stationary base station, the base position is transmitted at a low rate, for example, once every 30 seconds or so. The transmitted position is usually entered as a "fixed" position in the base receiver. In the system with two moving units, the master station position transmitted is the filtered inertial position controlled by a single point GNSS. It is transmitted at times associated with GNSS measurements, e.g., 1 Hz.

The improvement further utilizes extrapolated position and velocity and, as appropriate, attitude information relating to the master to update the inertial position correction, such that the corrections more accurately reflect the expected movement of the master during the measurement interval.

As shown in FIG. 1, the invention relates to the positioning of a rover vehicle, here an aircraft 105, such as, e.g., a helicopter, for landing on a designated pad 115 on the deck 110 of a master vehicle, here a sea going vessel. Both the master and the rover have navigation units described herein and they are provided with a wireless link 120 for transmission of data from the master to the rover.

Figure 2:
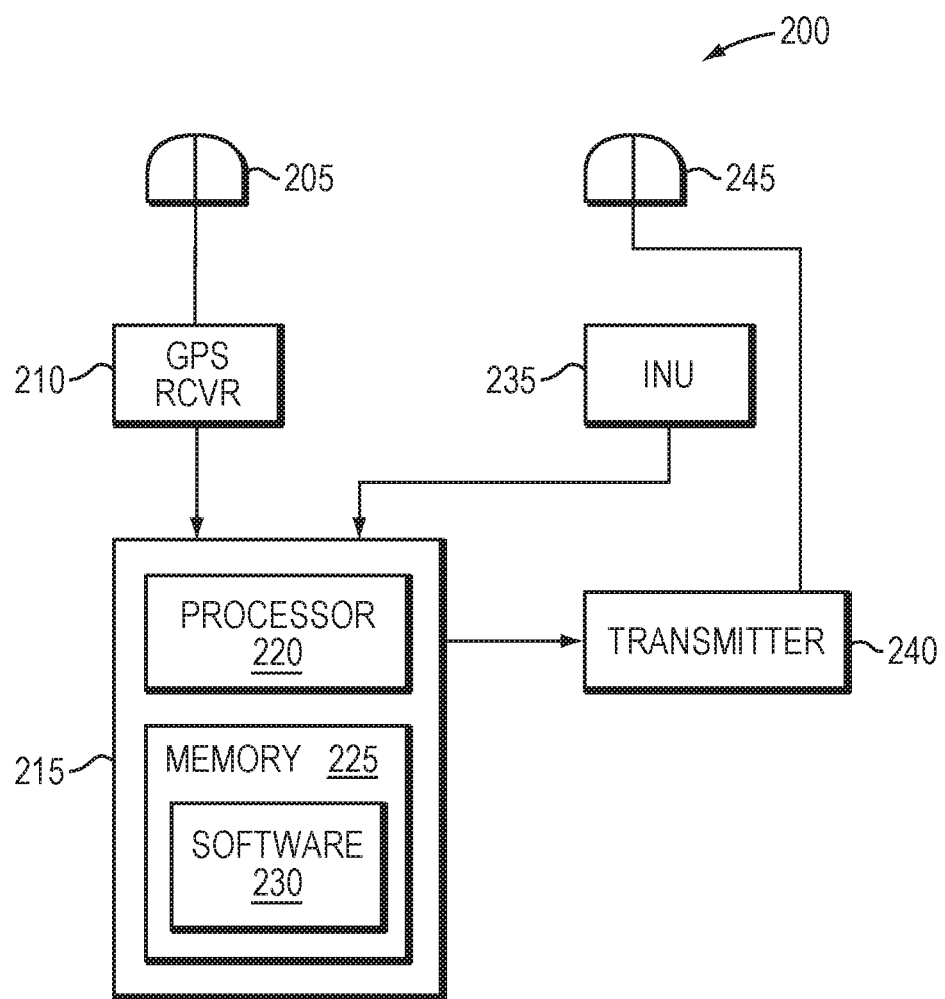
FIG. 2 is a diagram of a ship-board navigation unit used in the system of FIG. 1 in accordance with an illustrative embodiment of the present invention.

With reference to FIG. 2, the master carries a GNSS/INS navigation unit comprising a GNSS antenna 205, a GNSS receiver 210, an inertial navigation unit (INU) 235, a computer 215, an RTK transmitter 240, and an antenna 245. Illustratively, the computer comprises of a processor 220 and memory 225 that stores software 230 to be executed by the processor 220. The GNSS receiver 210 provides position readings but at a rate that is too low for the operations contemplated by the invention. These readings are used by the processor 220 to update the INU 235, which is subject to long term drift but provides position data at a relatively high rate. An arrangement for integrating an INS with a GNSS receiver is described in "OEM4 Inertial: An Inertial/GNSS Navigation System on the OEM4 Receiver", Proceedings of the International Symposium on Kinematic Systems in Geodesy, Geomatics and Navigation (KIS), Banff, Alberta, September 2001, by Ford et al, the contents of which are hereby incorporated by reference. GNSS RTK (Real Time Kinematics) information and INU 235 readings are transmitted to the aircraft over the wireless link 120.

Figure 3:
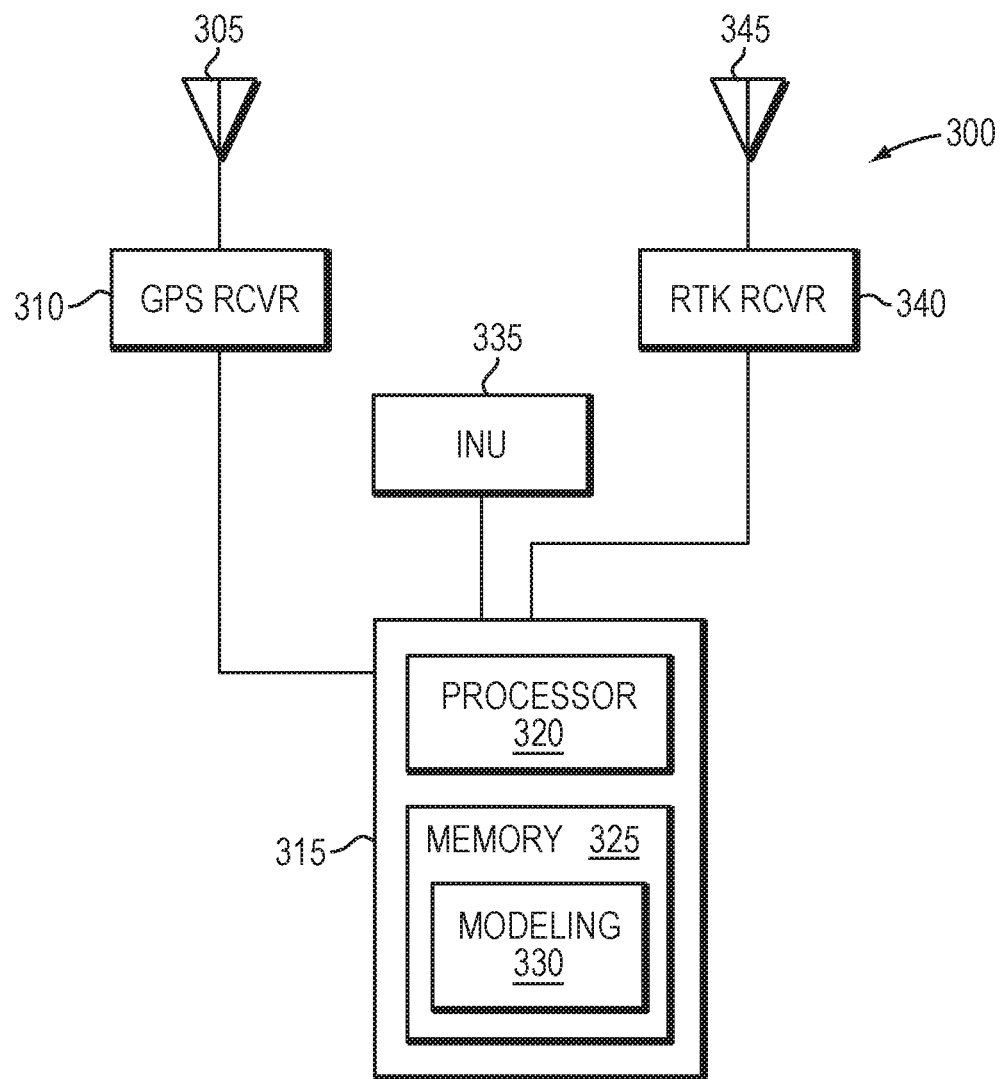
FIG. 3 is a diagram of a navigation unit carried on the aircraft for use in the system of FIG. 1 in accordance with an illustrative embodiment of the present invention.

With reference next to FIG. 3, the rover carries a GNSS/INS navigation unit comprising a GNSS antenna 305, a GNSS receiver 310, an INU 335, a computer 315, an RTK receiver 340, and an antenna 345. The computer 315 illustratively comprises a processor 320 and a memory 325 that stores a modeling subsystem 330 to be executed by the processor 320. The processor 320 uses the usual RTK procedures to enhance the position data provided by the GNSS receiver 310 and to compute a vector 125 to the shipboard GNSS antenna 305. In turn, the processor updates the INU 335 periodically with the enhanced GNSS data. Although the relative accuracy of the update position at the remote is accurate to within 1 to 2 centimeters (typically), the absolute accuracy of the update position at the remote has an accuracy of just 1 to 2 meters. This is reflected in the variance of the position used in the Kalman update. The output position of the inertial system at the rover is then modified by a post-update position correction that restores the relative accuracy between the two moving systems to the centimeter level. The correction is computed by differencing the post-update master position and the post-update rover position and subtracting this difference from the RTK vector used to generate the pre-update rover position.

With this arrangement, the RTK corrections to the GNSS position of the aircraft provide the aircraft with an accurate position relative to the ship's GNSS antenna. Accordingly the aircraft pilot (or a servo system controlling the aircraft), by virtue of the comparison of the INU 335 position data on the aircraft and the INU 235 data transmitted to the aircraft, has an accurate, low-latency distance from and bearing to the antenna 305 on the ship. The ship also calculates the parameters of a vector from the GNSS antenna 305 to the landing pad 115. The aircraft uses this information, which is transmitted over the wireless link, to provide the aircraft with a vector to the landing pad 115.

As discussed, the master may be, for example, another aircraft, a land vehicle, a vehicle that is part of a convoy, and so forth, and the rover may be, for example, an aircraft, another land vehicle, another vehicle in the convoy, and so forth.

Between GNSS measurement epoch updates, the modeling subsystem 330 provides to the processor 320 the result of applying a constant acceleration/rotation model to the master PVA solution, to propagate position, velocity and attitude of the master. This allows the system to then generate corrections for the relative expected master and sensed rover solutions at rates higher than the matched observation rate.

The rover estimates the dynamics experienced at the master by extrapolating from the last two solutions.

$$\Delta v_{t1t0}{}^m = v_{t1}{}^m - v_{t0}{}^m$$

$$\Delta a_{t1t0}{}^m = a_{t1}{}^m - a_{t0}{}^m$$

Assuming the rates computed remain constant until the next received solution (i.e., t2), the master solution is adjusted to the output time, tn, as follows.

$$p_{tn}^m = p_{t1}^m + (v_{t1}^m)(tn - t1) + \frac{\left(\frac{\Delta v_{t1t0}^m}{t1 - t0}\right)(tn - t1)^2}{2.0}$$

$$v_{tn}^m = v_{t1}^m + \left(\frac{\Delta v_{t1t0}^m}{t1 - t0}\right)(tn - t1)$$

$$a_{tn}^m = a_{t1}^m + \left(\frac{\Delta a_{t1t0}^m}{(t1 - t0)}\right)(tn - t1)$$

Following the adjustment of the master PVA solution, a high rate relative solution can be computed at the rover, without needing high rate data from the master.

$$\Delta p_{tn}{}^{rm} = p_{tn}{}^r - p_{tn}{}^m$$

$$\Delta v_{tn}{}^{rm} = v_{tn}{}^r - v_{tn}{}^m$$

$$\Delta a_{tn}{}^{rm} = a_{tn}{}^r - a_{tn}{}^m$$

The relative solution can be rotated to various output frames by computing the corresponding rotation matrix. The master transmits the PVA solution in the local level frame. Therefore, if the output frame is also local level no rotation is required. If the output frame is selected to be ECEF, the current local level solution can be rotated using the following rotation matrix.

$$R_l^e = \begin{bmatrix} -\sin\lambda & -\sin\varphi\cos\lambda & \cos\varphi\cos\lambda \\ \cos\lambda & -\sin\varphi\sin\lambda & \cos\varphi\sin\lambda \\ 0.0 & \cos\varphi & \sin\varphi \end{bmatrix}$$

Where,
φ—latitude
λ—longitude

If the output frame is selected to be Master/Remote body fame, the current local level solution can be rotated using the attitude of the Master/Remote by computing the following rotation matrix.

$$R_l^b = \begin{bmatrix} \cos\gamma\cos\beta - \sin\gamma\sin\alpha\sin\beta & \sin\gamma\cos\beta + \cos\gamma\sin\alpha\sin\beta & -\cos\alpha\sin\beta \\ -\sin\gamma\cos\alpha & \cos\gamma\cos\alpha & \sin\alpha \\ \cos\gamma\sin\beta + \sin\gamma\sin\alpha\cos\beta & \sin\gamma\sin\beta + \cos\gamma\sin\alpha\cos\beta & \cos\alpha\cos\beta \end{bmatrix}$$

Where,
α—pitch of the reference frame
β—roll of the reference frame
γ—yaw of the reference frame As discussed, the system's rotation of the relative position information provides the information to a user on other instrumentation in a format that is useful to them. For example, other area GNSS receivers may require the information in ECEF format. The master may broadcast its PVA solution to multiple rovers, and the rovers may then determine their position relative to the master or a particular location on the master. For example, in a convoy the master may determine the positions relative to a front corner of the master vehicle. The various vehicles may then operate to maintain desired positional relationship with the moving master, to ensure the convoy moves in a desired manner. Similarly, landing aircraft may determine their positions relative to a landing pad in order to operate in an orderly and efficient landing scenario.

Figure 4:
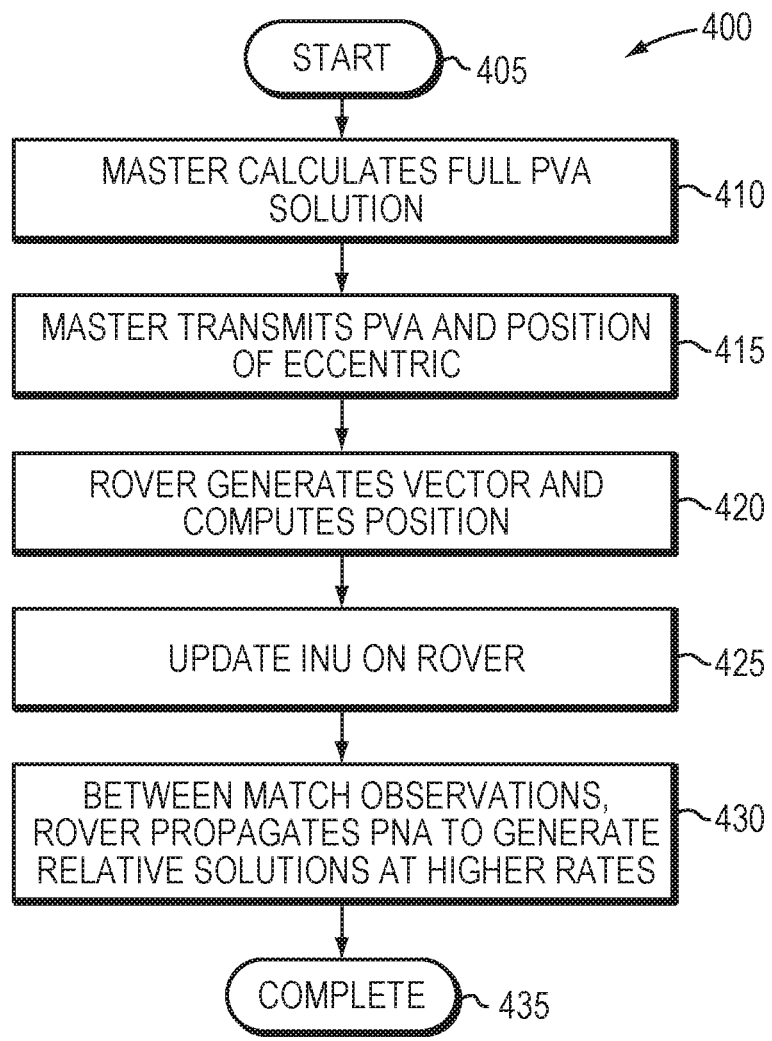
FIG. 4 is a flowchart detailing a procedure for relative position navigation in accordance with an illustrative embodiment of the present invention.

FIG. 4 is a flowchart detailing the steps of a procedure 400 for relative position navigation in accordance with an illustrative embodiment of the present invention. The procedure 400 begins in step 405 and continues to step 410 where the GNSS/INS unit at the master, such as, for example, a ship-based unit, provides the full position, velocity, attitude (PVA) solution, including GNSS observations, pseudorange and carrier measurements. The master then transmits the full PVA solution as well as the position of an eccentric point, e.g., a landing pad, to the rover in step 415. Then, in step 420, the rover-based unit generates a precise carrier-based vector between its own antenna and the GNSS antenna of the master unit and uses this to compute a GNSS position that has a high accuracy relative to the GNSS antenna on the master. This GNSS position is used to update an inertial guidance unit in the rover so that a low-latency position can be generated by the rover unit in step 425. In step 430, in between the matched observations, the rover unit propagates the position, velocity and attitude over a measurement interval based on constant velocity rotation rate models of the movement of the master. This allows the rover to generate relative solutions at rates that coincide with INS sensor readings, e.g., 200 Hz. More generally, by having the full master PVA solution, the rover estimates the dynamics experienced at the master by extrapolation based on PVA solutions over multiple measurement intervals, such that the rover unit adjusts the relative positions and thus the correction applied to the rover solution between measurement times to provide greater accuracy at higher rates. The procedure 400 then completes in step 435.

While various embodiments have been described herein, it should be noted that the principles of the present invention may be utilized with numerous variations while keeping with the spirit and scope of the disclosure. Thus, the examples should not be viewed as limited but should be taken as way of example.

What is claimed is:

1. A navigation system for moving vehicles, the system comprising:
   A. a master navigation unit comprising:
      1. a first Global Navigation Satellite Signal (GNSS) antenna;
      2. a first GNSS receiver configured to process signals from the first GNSS antenna;
      3. a first inertial navigation unit (INU) configured to receive first periodically updated data generated by the first GNSS receiver, at an output rate;
      4. a transmitter configured to transmit, over a wireless link, master GNSS data and INU data from the master navigation unit; and
   B. a rover navigation unit comprising:
      1. a second GNSS antenna;
      2. a second GNSS receiver configured to process signals received from the second GNSS antenna;
      3. a second INU including one or more sensors and configured to receive second periodically updated data based on updated data from the first INU and a Real Time Kinematics (RTK) moving baseline vector determined using data from the first and second GNSS receivers, with the data from the first and second GNSS receivers;
      4. a receiver configured to receive signals from the master navigation unit, the signals being transmitted over the link by the transmitter;
      5. a processor configured to generate the RTK moving baseline vector from the first GNSS antenna to the second GNSS antenna, the processor further configured to
         determine a post-update correction vector for the RTK baseline vector based on post-update first INU and second INU position information and determine a post-update inertial position correction using the post-update correction vector, and
         model a movement of the master navigation unit between measurement epochs and update the post-update correction vector between the measurement epochs based on results of the modeling and sensor reading from the one or more sensors of the second INU; and
      6. the second INU further configured to update its output with the post-update inertial position correction and to compute a position vector from the second INU to a designated location on the master navigation unit.

2. The system of claim 1, wherein
   the master navigation unit is further configured to generate a second vector from the first GNSS antenna to the designated location, and configured to transmit generating data for generating the second vector to the rover navigation unit; and
   the rover navigation unit configured to generate the position vector from the rover to a landing pad that is the designated location.

3. The system of claim 1, including a Kalman filter that is configured to update parameters of the second INU.

4. The system of claim 1, wherein the output of the second INU is calculated using a Kalman filter.

5. The system of claim 4, wherein the rover navigation unit is configured to correct the output of the second INU using the post-update inertial position correction to restore relative accuracy between the master navigation unit and the rover navigation unit.

6. The system of claim 5, wherein the rover navigation unit is configured to compute the post-update inertial position correction by differencing a post-update position of the master navigation unit and a post-update position of the rover navigation unit, and subtracting this difference from the RTK moving baseline vector.

7. The system of claim 1, wherein the RTK moving baseline vector between the master navigation unit and the rover navigation unit is calculated using actual measurements that correspond to a same time tag utilized at the second receiver and the first receiver, respectively.

8. The system of claim 7, wherein the rover navigation unit is configured to update a Kalman filter utilizing a timing based on a latency associated with the actual measurements.

9. The system of claim 8, wherein the rover navigation unit is configured to update the Kalman filter to ensure the actual measurements have the same time tag.

10. The system of claim 1, wherein the rover navigation unit is configured to utilize the RTK moving baseline vector to determine an accurate position relative to the first GNSS antenna onboard the master navigation unit.

11. The system of claim 1, wherein the processor of the rover navigation unit is configured to compare inertial navigation unit position data of the rover navigation unit to inertial navigation unit position data transmitted to the rover navigation unit from the master navigation unit, to determine a low latency distance from and bearing to the first GNSS antenna onboard the master navigation unit from the rover navigation unit.

12. The system of claim 1, wherein the master navigation unit is further configured to calculate information including parameters of a vector from the first GNSS antenna to the designated location.

13. The system of claim 12, wherein the information is transmitted over the wireless link from the master navigation unit to the rover navigation unit.

14. The system of claim 13, wherein the rover navigation unit is configured to use the information to provide the rover navigation unit with a vector to the designated location.

15. The system of claim 1, wherein
   the model of the movement of the master navigation unit is a constant velocity rotation rate model.

16. The system of claim 1, wherein the master GNSS data and INU data includes at least master position, velocity, and attitude (PVA) solution information, and the processor further configured to:
   apply a constant acceleration/rotation model to the master PVA solution information to model the movement of the master navigation unit between measurement intervals.

17. A system comprising
   on a master, a first navigation unit comprising:
      a first satellite signal receiver configured to process signals received by a first antenna;
      a first inertial navigation unit (INU) configured to be updated using data that are provided by the first satellite signal receiver;
      a transmitter configured to transmit satellite signal and INU information;
   on a rover, a second navigation unit comprising:

a second satellite signal receiver configured to process signals received by a second antenna;

one or more processors configured to use data from the first and second satellite receivers to determine a Real Time Kinematics (RTK) moving baseline vector between the first antenna and the second antenna;

a second INU having one or more sensors and configured to be periodically updated based on the RTK moving baseline vector and updated data from the first INU; and the one or more processors configured to produce a post-update inertial position correction based on a correction calculated for the RTK moving baseline vector using post-update data from the first and second INUs, and configured to update an output position of the second navigation unit with the post-update inertial position correction to restore relative accuracy between the master and the rover navigation units and produce a corrected relative rover position, and further configured to model a movement of the master between measurement epochs and update the correction for the RTK moving baseline vector between the measurement epochs based on the results of the modeling and sensor reading from the one or more sensors of the second INU.

18. The system of claim 17, further including in the first navigation unit, one or more processors of the first navigation unit and configured to produce a vector from the first antenna to a predetermined landing pad that is a designated location; and in the second navigation unit, the one or more processors configured to determine a vector from the corrected relative rover position to the designated location based on the vector from the first antenna to the designated location.

* * * * *